Patented Feb. 18, 1947

2,416,234

UNITED STATES PATENT OFFICE 2,416,234

SERIES OF NITROFURAN COMPOUNDS

William B. Stillman and Albert B. Scott, Norwich, N. Y., assignors, by mesne assignments, to Eaton Laboratories, Inc., Norwich, N. Y., a corporation of New York No Drawing. Application August 28, 1945, Serial No. 613,205

9 Claims. (Cl. 260—345)

This invention relates to a new series of chemical compounds which have proved of therapeutic value, especially when administered orally. The series includes a number of closely related nitrofuran compounds described by the general formula:

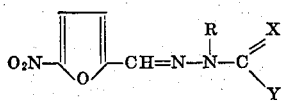

in which R represents hydrogen, alkyl and hydroxyalkyl, X represents a simple divalent substituent such as O or S, and Y represents amido, alkyl, amidoalkyl, alkylamido, carbamido, guanido, carbamyl and hydroxyalkylcarbamyl.

This application is a continuation-in-part of our co-pending applications filed May 17, 1944, and bearing respectively Serial Numbers 536,046, 536,047 and 536,048, and is filed as a substitute for those applications.

We have made the discovery that the new compounds, while sharing the antiseptic properties which are common to many nitrofurans, are distinguished therefrom by their effectiveness against infections when administered orally. In doses well below the toxic limit, they have proved highly effective in the treatment of streptococcus and trypanosome infections, gonorrhea, cystitis, pyelitis and peritonitis following appendectomy. They are new drugs which are effective against a wider range of bacteria than is penicillin, and they are not subject to the difficulties encountered in the use of pencillin because of its instability. Unlike the sulfonamides, they are bactericidal as well as bacteriostatic and maintain these activities in the presence of body fluids, bacterial debris and dead tissue. In short, they are valuable chemotherapeutic agents.

The preparation of the new drugs in a form which will permit ready oral administration is easy. The particular new drug selected for use may be incorporated in tablets or in lozenges. Such tablets are compounded in conventional fashion by granulating the drug with standard starch paste, drying, adding dry starch and pressing out the tablets. The lozenges are componded in conventional fashion also, by granulating wtih sugar syrup and then adding bulk in the form of powdered sugar and dry starch, and a flavoring material.

The various members of the new series of drugs differ from each other somewhat in degree of therapeutic activity. A particular member of the series which we now prefer and which has been found to provide an extremely valuable chemotherapeutic agent is 5-nitro-2-furaldehyde semicarbazone. Tablets or lozenges containing about one-quarter gram of that drug administered orally to humans have exhibited astonishing effectiveness in combating infections.

The new compounds may be synthesized by means of the well-known reaction between aldehydes or ketones and compounds possessing a reactive amido group. The aldehyde 5-nitro furfural (or related ketones) is condensed with a compound which will provide a side chain having the following configuration:

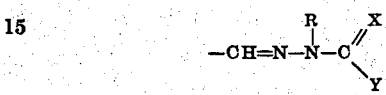

in which R, X and Y have the significance described above.

In order that the invention may be entirely available to those skilled in the art, methods for making a number of the new compounds of the series are described briefly:

EXAMPLE 1

*5-nitro-2-furaldehyde semicarbazone*

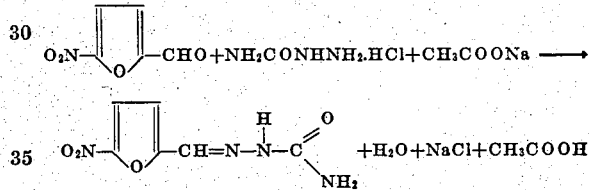

A mixture of 43 g. of semicarbazide hydrochloride and 31 g. of sodium acetate is dissolved in 150 cc. of water. The pH of this solution is approximately 5. Ethyl alcohol (95% by volume) in the amount of 250 cc. is added and the mixture is stirred mechanically. A solution of 53.5 g. of carefully purified 2-formyl-5-nitrofuran in 250 cc. of the said alcohol is added dropwise to the semicarbazide solution at room temperature. After completing the addition of the aldehyde solution, the mixture is stirred for another hour. The precipitate is removed from the reaction mixture by filtration. It is washed well with ethyl alcohol and dried to constant weight at 70° C. in an oven. The product weighs 73 g., corresponding to a yield of 97%. It is obtained in the form of pale yellow needles, which are not subjected to further purification.

EXAMPLE 2

5-nitro-2-furaldehyde 2'-methyl semicarbazone $$CH_3.NH.NH_2 + HCNO \longrightarrow \underset{NH_2.\overset{\overset{\displaystyle CH_3}{|}}{N}.CO.NH_2}{}$$

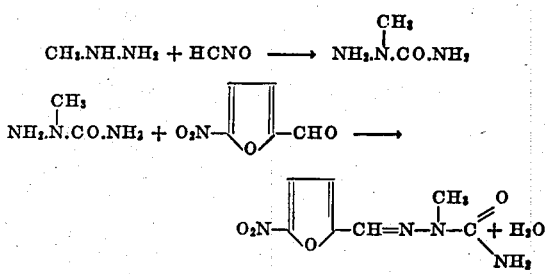

2-methyl semicarbazide is prepared according to the method of von Brüning, Ann. 253, 11 (1889). The crude product prepared from 4.0 g. (0.028 mole) of methyl hydrazine sulfate is dissolved in 75 cc. of alcohol and to the solution is added 3.9 g. (0.028 mole) of 5-nitrofurfural. The mixture is stirred for several minutes, whereupon the 2-methyl semicarbazone precipitates as a yellow crystalline solid. The product is collected on a filter and purified by recrystallization from boiling alcohol; yield, 3.5 g. (60%), as bright-yellow needles; M. P. 213–214°; solubility in water, 1:3000.

EXAMPLE 3

5-nitro-2-furaldehyde 4'-methyl semicarbazone $(CH_3)_2SO_4 + KCNO \longrightarrow CH_3NCO + CH_3KSO_4$ $CH_3NCO + NH_2.NH_2 \longrightarrow NH_2.NH.CO.NHCH_3$

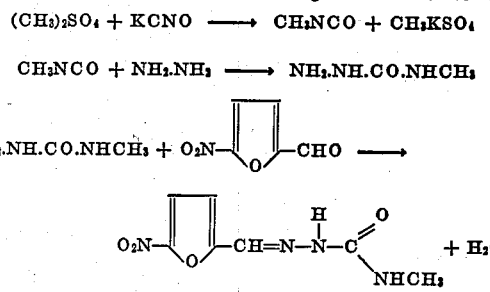

Methyl isocyanate is prepared from potassium cyanate and dimethyl sulfate according to the method of Slotta and Lorenz, Ber. 58, 1320 (1925). Then, 4-methyl semicarbazide is prepared according to the directions of Backer, Rec. trav. chim, 34, 198 (1915), by allowing hydrazine to react with methyl isocyanate. The crude product obtained from 2.1 g. (0.06 mole) of hydrazine and 3.7 g. (0.06 mole) of methyl isocyanate is dissolved in 200 cc. of 50% alcohol and to the solution is added 4 g. (0.028 mole) of 5-nitrofurfural and two drops of acetic acid (to catalyze the condensation). The mixture is warmed for one-half hour on the steam bath, cooled, and filtered. The product, 5-nitro-2-furaldehyde 4'-methyl semicarbazone, is collected, and purified by recrystallization from alcohol. The yield is 5.2 g. (88%) of tiny, yellow needles; M. P. 201–202° (w. decomp.); solubility in water, 1:2000.

EXAMPLE 4

5-nitro-2-furfurylidene acethydrazide $CH_3COOC_2H_5 + NH_2.NH_2 \longrightarrow CH_3CO.NH.NH_2 + C_2H_5OH$

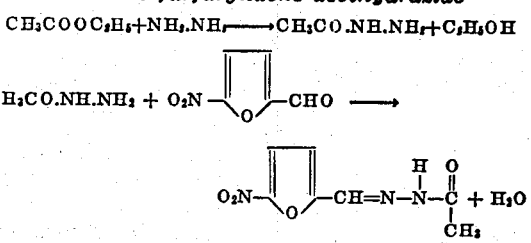

Acethydrazide is prepared from ethyl acetate and hydrazine hydrate according to the method of Curtius and Hoffman, J. Prakt. Chem. (2) 53, 524 (1893). A solution is prepared from 3.5 g. (0.047 mole) of acethydrazide and 100 cc. of water, and to this is added 6.7 g. (0.047 mole) of 5-nitrofurfural. The mixture is stirred for five minutes, at which time precipitation of the condensation product commences. It is allowed to stand for one-half hour, and the 5-nitro-2-furfurylidene acethydrazide is collected on a filter. After recrystallization from a mixture of acetic acid and alcohol (1:1), the product is obtained as a microcrystalline yellow solid; yield, 6.9 g. (74%); it begins to darken at 220° and melts (w. decomp.) at 230–235°; solubility in water, 1:20,000.

The above described compound is not claimed herein as it forms the subject-matter of our divisional application filed October 19, 1946, Serial No. 704,528.

EXAMPLE 5

5-nitro-2-furfurylidene amino biuret $NH_2.CO.NH.CO.NH_2 + HNO_3 \xrightarrow{H_2SO_4} NO_2.NH.CO.NH.CO.NH_2 + H_2O$ $NO_2.NH.CO.NH.CO.NH_2 + 6H \xrightarrow{Zn+HCl} NH_2.NH.CO.NH.CO.NH_2 + 2H_2O$

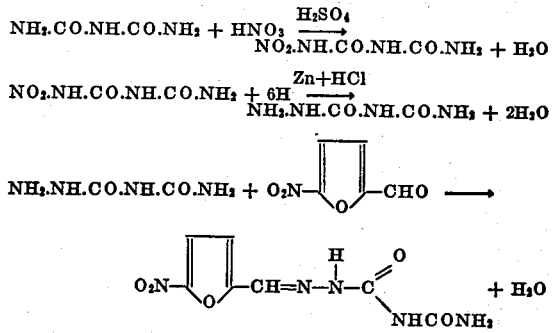

Nitrobiuret is prepared by the nitration of biuret as described by Thiele and Uhlfelder, Ann. 303, 95 (1898). One hundred g. (0.7 mole) of nitrobiuret is then reduced to amino biuret with zinc and hydrochloric acid according to the method described by Thiele and Uhlfelder, loc. cit., p. 99, with the exception that the amino biuret is not isolated as the benzal condensation product. Instead after removal of excess zinc by filtration, 15 g. (0.1 mole) of 5-nitrofurfural is added to the aqueous acid solution of amino biuret. On stirring the mixture, 5-nitro-2-furfurylidene amino biuret precipitates as a yellow solid; yield, 23.0 g. (95% based on the 5-nitrofurfural used). The product crystallizes difficultly from boiling acetic acid as a yellow microcrystalline solid which develops a high electrostatic charge when dry; the compound begins to darken at about 200° and melts (w. decomp.) at 210.5–211.5°; solubility in water, 1:20,000.

EXAMPLE 6

5-nitro-2-furaldehyde 2'-(β-hydroxyethyl) semicarbazone $$NH_2.NH_2 + CH_2\!\!-\!\!CH_2 \longrightarrow NH_2.NH.CH_2.CH_2OH$$
$$\underset{O}{\diagdown\diagup}$$

$NH_2.NH.CH_2.CH_2OH + HCNO \longrightarrow \underset{\overset{|}{CH_2.CH_2OH}}{NH_2\!\!-\!\!N\!\!-\!\!CO\!\!-\!\!NH_2}$

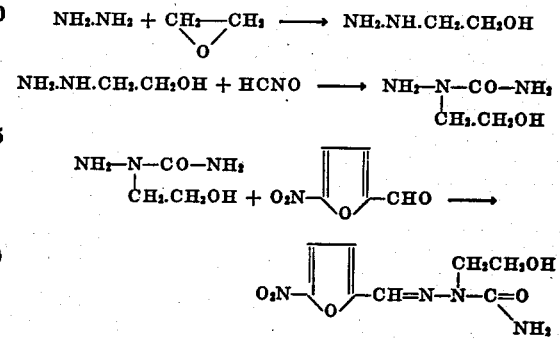

Hydroxyethyl hydrazine is prepared from hydrazine hydrate and ethylene oxide according to the method of Gabriel, Ber. 47, 3032 (1915). To a solution of 6.5 g. (0.085 mole) of hydroxyethyl hydrazine in 45 cc. of water is added a solution of 6.9 g. (0.085 mole) of potassium cyanate in 45 cc. of water. The mixture is allowed to stand overnight at room temperature and then is made acid to litmus with dilute hydrochloric acid. Twelve g. (0.085 mole) of 5-nitrofurfural is added, with stirring; the solution immediately turns orange, and after a few minutes, oily orange crystals of 5-nitro-2-furaldehyde 2'-(β-hydroxyethyl) semicarbazone precipitate. By recrystallizing rapidly from alcohol, the product is obtained in pure condition as small, bright orange plates; yield, 12.3 g. (60%); M. P. 214–216° (w. decomp.); solubility in water, 1:2000.

EXAMPLE 7

*5-nitro-2-furfurylidene aminocarbamyl guanidine hydrochloride*

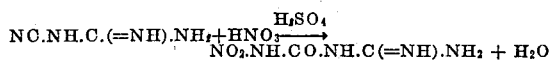

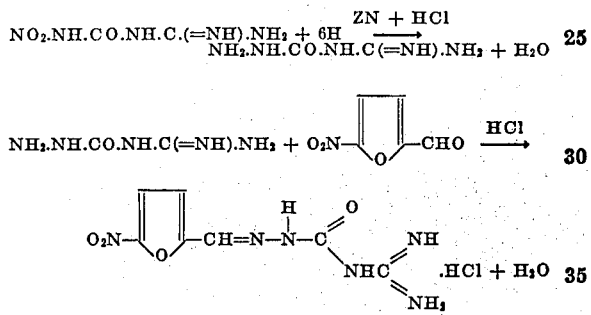

Nitrourea carboxylic acid amidine is prepared by the nitration of dicyandiamide as described by Thiele and Uhlfelder Ann. 303, 108 (1898). Twenty-five g. (0.17 mole) of the nitro amidine is then reduced to semicarbazide carboxylic acid (4)-amidine by zinc and hydrochloric acid according to the method of Thiele and Uhlfelder, loc. cit., p. 110, with the exception that the product is not isolated as its benzal condensation compound. Instead, after the excess zinc has been removed by filtration, 10 g. (0.07 mole) of 5-nitrofurfural is added to the aqueous acid solution. By stirring for five minutes and cooling in ice, the 5-nitro-2-furfurylidene aminocarbamyl guanidine hydrochloride is caused to precipitate as fine yellow needles; yield, 16.2 g. (35% based on nitrourea carboxylic acid amidine). The product crystallizes readily from hot water as broad yellow needles which lose hydrochloric acid at 150–155° and melt (w. decomp.) at 221–225°; solubility in water, 1:200.

EXAMPLE 8

*5-nitro-2-furfurylidene glycyl hydrazide hydrochloride*

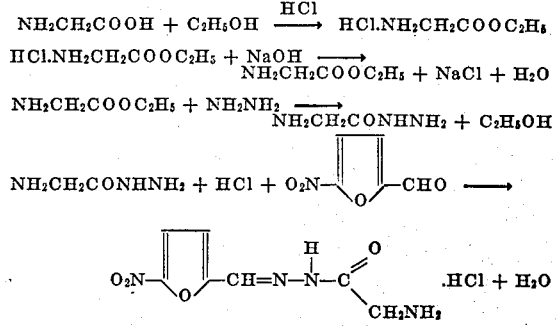

Glycine ethyl ester hydrochloride is prepared from glycine, absolute ethanol and dry hydrogen chloride, as described by Havries and Weiss, Ann. 327, 365. Then, this compound is converted to the free ester by treating with alkali, according to the method of E. Fischer, Ber. 34, 436. The ester is caused to react with hydrazine, in the manner described by Curtius, J. Prakt. Chem. 178, 102 (1904), to yield glycine hydrazide which, in turn, is transformed to glycine hydrazide dihydrochloride by treatment with concentrated hydrochloric acid. Then, to a solution of 12.6 g. (0.078 mole) of the dihydrochloride in 100 cc. of water is added, with stirring, a solution of 10.9 g. (0.078 mole) of 5-nitrofurfural in 100 cc. of ethanol. The mixture is stirred for ten minutes and allowed to stand overnight in the refrigerator. The condensation product is isolated by filtration, and is purified by recrystallization from 50% alcohol, yield, 12.7 g. (66%), as tiny yellow needles; M. P. 206–208° (w. decomp. and preliminary darkening at about 195°); solubility in water, 1:100.

EXAMPLE 9

*5-nitro-2-furaldehyde semioxamazone*

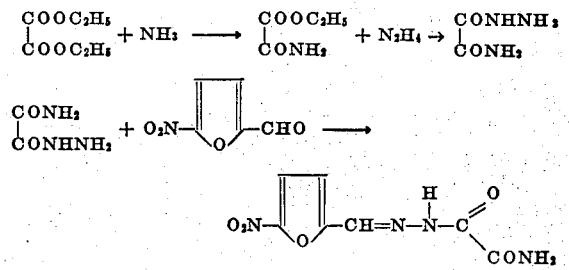

Oxalic ester amide is prepared from ethyl oxalate according to the directions of Weddigo, J. Prakt. Chem., (2), 10, 196 (1874). Semioxamazide is then prepared from this product by the method of Kerp and Unger, Ber. 30, 586 (1897). To a solution of 7 g. of the latter compound in hot water, is added, slowly with stirring, 9.55 g. of nitrofurfural in ethanol. The mixture is allowed to cool and the tan solid is removed by filtration. Purification is effected by suspending the product in warm dioxane, then allowing the mixture to cool. The solid is again removed by filtration. It is light yellow, microcrystalline, weighs 11.6 g. (76%); M. P. 250°; solubility in water, 1:200,000.

The above described compound is not claimed herein as it forms the subject-matter of our divisional application filed October 25, 1946, Serial No. 705,795.

EXAMPLE 10

*5-nitro-2-furaldehyde 5'(β-hydroxyethyl) semioxamazone*

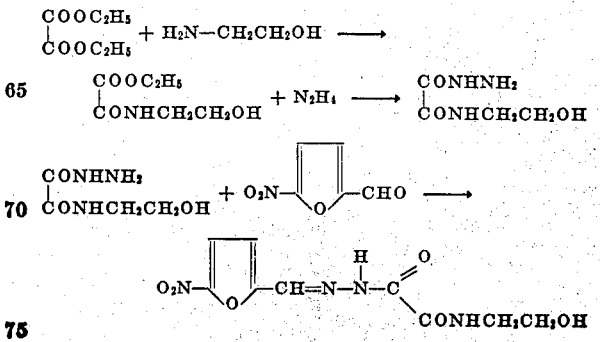

A solution of 36.5 g. (0.25 mole) of ethyl oxalate in 75 cc. of ethanol is cooled to 0°. To this is added in one portion, a solution of 15 g. (0.25 mole) of amino ethanol in 75 cc. of ethanol, and the mixture is allowed to stand in the icebox overnight. It is then filtered from a small amount of white solid, the ethanol is removed by distillation, and the residue is taken up in water and extracted with ether to remove any unchanged ethyl oxalate. The aqueous layer is refluxed for one hour with 10 g. of hydrazine hydrate and is then cooled. There is obtained 23 g. (72%) of 5-hydroxyethyl semioxamazide; M. P. 170–173°. To an aqueous solution of 8.05 g. (0.05 mole) of this product is added 7.05 g. (0.05 mole) of nitrofurfural, and the mixture is thoroughly shaken. The light yellow solid thus obtained (yield, 10.6 g., 78.5%) is purified by washing with warm ethanol; microcrystalline solid; M. P. 242–244° d.; solubility in water, 1:35,000.

The above described compound is not claimed herein as it forms the subject-matter of our divisional application filed October 25, 1946, Serial No. 705,794.

EXAMPLE 11

5-nitro-2-furaldehyde thiosemicarbazone

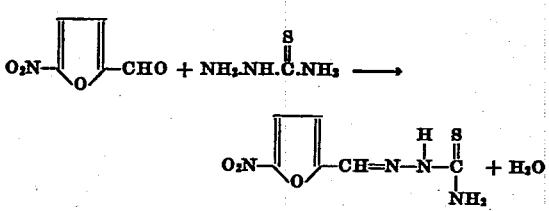

To a solution of 5.2 g. (0.037 mole) of 5-nitrofurfural in 100 cc. of 50% alcohol is added the equivalent quantity, 3.4 g., of thiosemicarbazide. The mixture is warmed on a steam bath until thte orange thiosemicarbazone precipitates, and then for five minutes longer. The mixture then is allowed to cool to room temperature, is filtered, and the product is washed with 50% alcohol. The theoretical quantity, 7.9 g., of 5-nitro-2-furaldehyde thiosemicarbazone is thereby obtained as tiny orange prisms. The compound has no well-defined M. P., but begins to darken in color at approximately 200° and is entirely black at 250°; solubility in water, 1:30,000.

The above described compound is not claimed herein as it forms the subject-matter of our divisional application filed October 25, 1946, Serial No. 705,796.

What is claimed is:

1. A compound having chemotherapeutic activity on oral administration and represented by the formula:

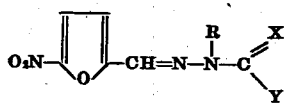

in which R represents a member of the group consisting of hydrogen, alkyl and hydroxyalkyl, X represents a member of the group consisting of O and S, and Y represents a member of the group consisting of amido, amidoalkyl, alkylamido, carbamido, guanido, carbamyl and hydroxyalkylcarbamyl.

2. A new chemical compound having chemotherapeutic activity and represented by the formula:

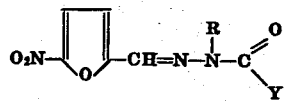

in which X represents a member of the group consisting of O and S, and Y represents a member of the group consisting of amido, amidoalkyl, alkylamido, carbamido, guanido, carbamyl and hydroxyalkylcarbamyl.

3. A new chemical compound having chemotherapeutic activity and represented by the formula:

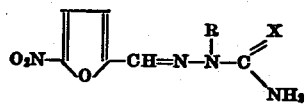

in which R represents a member of the group consisting of hydrogen, alkyl and hydroxyalkyl, and Y represents a member of the group consisting of amido, amidoalkyl, alkylamido, carbamido, guanido, carbamyl and hydroxyalkylcarbamyl.

4. A new chemical compound having chemotherapeutic activity and represented by the formula:

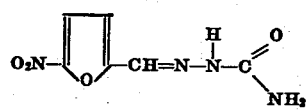

in which R represents a member of the group consisting of hydrogen, alkyl and hydroxyalkyl, and X represents a member of the group consisting of O and S.

5. 5-nitro-2-furaldehyde semicarbazone represented by the formula:

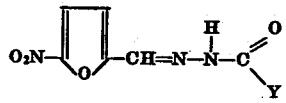

6. A new chemical compound having chemotherapeutic activity and represented by the formula:

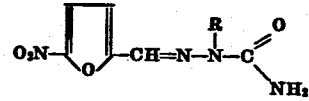

in which Y represents a member of the group consisting of amido, amidoalkyl, alkylamido, carbamido, guanido, carbamyl and hydroxyalkylcarbamyl.

7. A new chemical compound having chemotherapeutic activity and represented by the formula:

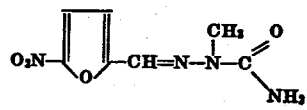

in which R represents a member of the group consisting of hydrogen, alkyl and hydroxyalkyl.

8. 5-nitro-2-furaldehyde 2'-methyl semicarbazone represented by the formula:

9. 5-nitro-2-furaldehyde 2'-(β-hydroxyethyl) semicarbazone represented by the formula:
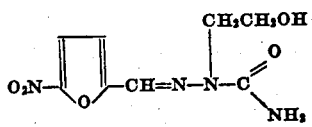
WILLIAM B. STILLMAN.
ALBERT B. SCOTT.
REFERENCES CITED
The following references are of record in the file of this patent:
UNITED STATES PATENTS
| Number | Name | Date |
| --- | --- | --- |
| 2,261,735 | Gertler et al. | Nov. 4, 1941 |
OTHER REFERENCES
Karrer, Organic Chemistry, 1938, page 143.
Heilbron, Dictionary of Organic Compounds, vol. III, page 151.